United States Patent

[11] 3,539,202

[72] Inventor Permil N. Nelson
  Galesburg, Illinois
[21] Appl. No. 769,158
[22] Filed Oct. 21, 1968
[45] Patented Nov. 10, 1970
[73] Assignee Lynn H. Ewing doing business as
  Blackhawk Company
  Rock Island, Illinois

[54] FIFTH WHEEL LOCKING MECHANISM
  4 Claims, 2 Drawing Figs.
[52] U.S. Cl. ................................................. 280/434
[51] Int. Cl. ............................................. B62d 53/12
[50] Field of Search ....................................... 280/434, 438

[56] References Cited
UNITED STATES PATENTS

| | | | | |
|---|---|---|---|---|
| 1,981,233 | 11/1934 | Harris | | 280/434 |
| 2,426,002 | 8/1947 | Den Besten | | 280/434 |
| 2,456,826 | 12/1948 | Fontaine | | 280/434 |
| 2,610,069 | 9/1952 | Ketel | | 280/434 |

Primary Examiner—Leo Friaglia
Attorney—Edward C. Threedy

ABSTRACT: A locking mechanism for the coupling pin connection between a tractor unit and a semitrailer which provides a positive three point bearing contact between the coupling pin and the connecting plate, the latter including an automatic locking unit movable in response to the position of the coupling pin relative to the connecting plate.

Patented Nov. 10, 1970 3,539,202

INVENTOR
PERMIL N. NELSON
BY Edward C. Threedy
HIS ATTORNEY.

FIFTH WHEEL LOCKING MECHANISM

SUMMARY OF THE INVENTION

An articulated connection between two coupling parts comprising a coupling pin secured to one part and a receiving connecting plate including a locking assembly carried by the other part. The locking assembly comprises a movable lock arm responsive to the presence of the coupling pin within a receiving passage formed in the connecting plate and a manually operated latch bolt for releasably latching the lock arm about the coupling pin.

DETAILED DESCRIPTION

Figure 1:
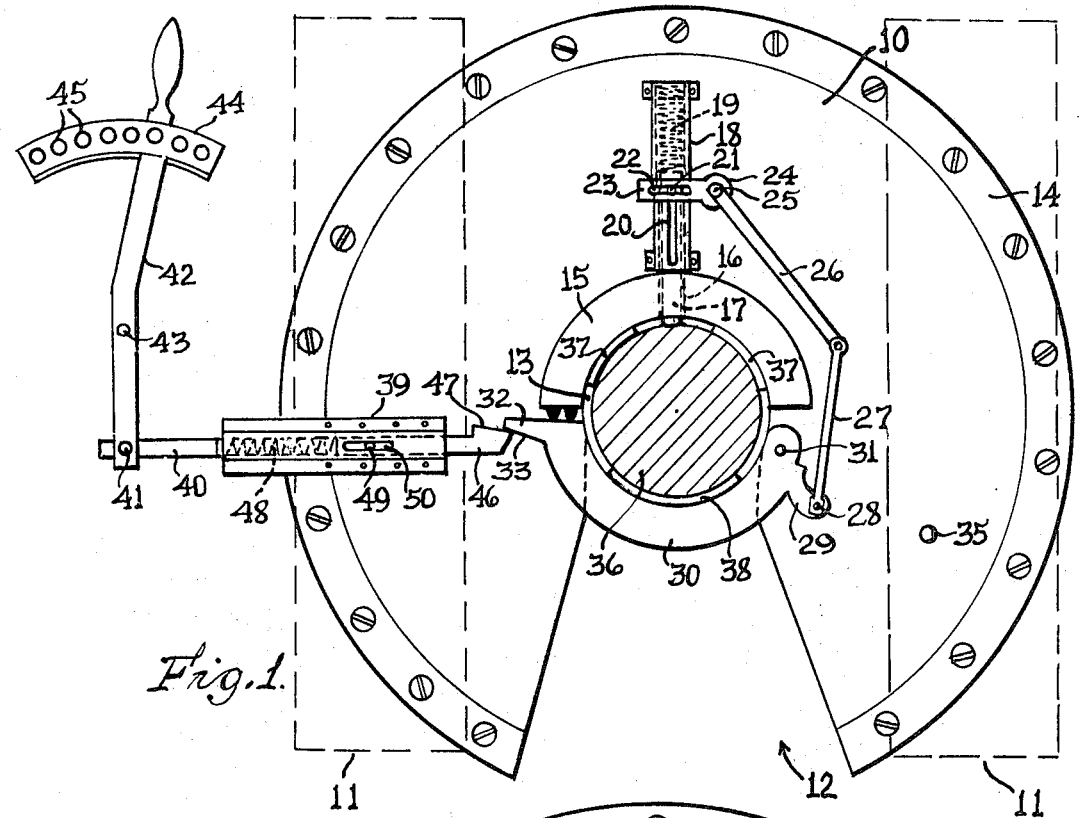
Figure 2:
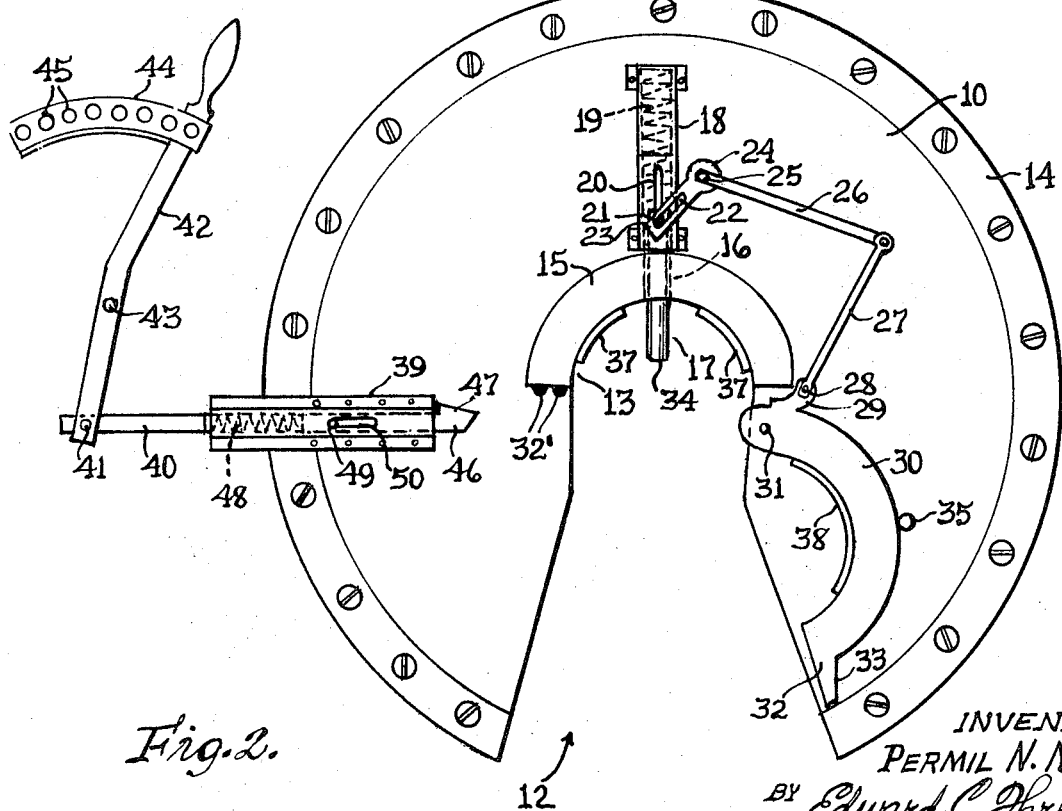

The invention will be best understood by reference to the accompanying drawing in which the preferred form of construction of the invention is shown, and in which:

FIG. 1 is a top plan view of so much of the invention and its environment necessary for an understanding of its operation, the coupling pin being shown in section and the connecting plate supporting members being shown in dotted lines, and FIG. 2 is a top plan view similar to FIG. 1 but showing the locking assembly in its unlocked or coupling pin receiving position.

Semitrailer coupling pin locking mechanisms or fifth wheel connectors, as they are known in the art, normally include a connector plate carried at rear of a tractor and a coupling pin carried by and depending from a trailer unit such as is disclosed in my U.S. Pat. No. 3,352,571 issued Nov. 14, 1967. These general structural parts have not been shown in detail in the drawings of this application, and will not be described except for reference to their environment respecting the present invention.

In the drawings there is shown in top plan view a connecting plate 10 normally supported on rails 11 (shown in dotted lines) carried in a general horizontal plane on the rear of a tractor. The plate 10 has formed therein a rearwardly extending dove-tailed entry slot 12 which terminates into a semicircular center opening 13. The plate 10 is provided with a raised peripheral edge 14 over which a cover (not shown) is adapted to be placed to enclose the locking assembly hereinafter described.

Fixedly mounted on the plate 10 and within the raised peripheral edge 14 and extending semicircularly about and in alignment with the opening 13 is a raised rail 15. The rail 15 has formed therethrough a passage 16 in which is slidably journaled a plunger 17. This plunger 17 moves through a housing 18 mounted on the plate 10 between the rail 15 and the raised peripheral edge 14 as seen in FIGS. 1 and 2. The plunger 17 is normally urged outwardly of its housing 18 by an expansion spring 19 contained therein with the distance of movement determined by the length of a slot 20 formed in the top wall of the housing 18 and through which projects a pin 21 fixed to the inner end of the plunger 17.

The pin 21 also projects through a slot 22 formed in one arm 23 of a toggle link 24. The toggle link 24 is pivoted about a stud 25 and moves in response to the directional movement of the plunger 17 such that its opposite elongated arm 26 is moved toward and away from the center opening 13. The free end of the arm 26 is pivotally connected to a second link arm 27, which has its opposite free end pivotally connected as at 28 to a finger 29 provided by the coupling pin lock arm 30.

As shown in the drawings, the coupling pin lock arm 30 comprises a semicircular member which, together with the raised rail 15, comprises a circular retaining collar for the coupling pin 26. The lock arm 30 has one end pivotally connected as at 31 to the plate 10, and its opposite free end formed to provide a laterally extending flange member 32 which has one side edge 33 tapered for a purpose hereinafter explained.

As shown in FIG. 2 the locking mechanism of the invention is in its unlocked or coupling pin receiving position. In such position the plunger 17 under the action of the spring 19 has been moved through the housing 18 as well as the opening 16 formed in the rail 15 to a point where its free end 34 is exposed within the center opening 13 formed in the plate 10. By the positioning of the plunger 17 the toggle link 24 has been pivoted about the stud 25 such that the link arms 26 and 27 have effected a pivoted movement of the lock arm 30 into a retracted position out of the entry slot 12 and against a stop pin 35 carried by the plate 10.

As the trailer and tractor units are moved together the depending coupling pin 26 will move through the entry slot 12 and into the center opening 13 against the free end 34 of the plunger 17. As the coupling pin 36 moves into the center opening 13 it will force the plunger 17 inwardly of its housing 18 against the spring 19 and through the pin 21 the plunger 17 will pivot the toggle link 24 in a clockwise direction, as shown, so that the locking arm 30 through pivotal movement of the link arms 26 and 27 will pivot into its locking position wherein it extends across the entry slot 12 to where it completes the encirclement of the coupling pin 36, as shown in FIG. 1, the flange member 32 being disposed against bumpers 32' formed of rubber or the like.

It should be noted that the rail 15, as well as the locking arm 30, are each provided with arcuated sectional bearing elements 37 and 38, respectively, which when the locking arm 30 is in its locking position bear against the peripheral edge of the coupling pin 36, thus providing a positive three point contact therewith.

Carried by the plate 10 and extending radially with respect to the center opening 13, and spaced therefrom is a second housing 39 which slidably contains a latch lever 40. One end of the latch lever 40 is pivotally connected as at 41 to one end of an operating handle 42, which is adapted to be pivoted about a fixed pivot pin 43. The free end of the handle 42 is movable through a locking bracket 44 which is provided with a series of openings 45 through which a locking element may be projected to secure the handle 42 in any pivoted position.

The free end of the latch lever 40 provides an enlarged head 46 which has one edge 47 tapered to correspond to the tapered edge 33 of the latch finger 32. The latch lever 40 is normally urged into a connecting position between its enlarged head 46 and the latch finger 32 by a compression spring 48 contained within the housing 39. The distance of movement of the latch lever 40 through the housing 39 is guided by a pin 49 carried thereby which projects through an elongated slot 50 formed in the top wall of the housing 39.

When the lock arm 30 has been pivoted, as hereinbefore described, it will be held in place by manual movement of the handle 42 which effects movement of the latch lever 40 in the direction of the lock arm 30 such that the enlarged head 46 of the lever 40 will engage the latch finger 32 of the lock arm 30 and by contact of the tapered side walls 47 and 33 will wedge the lock arm 30 in a clockwise direction so as to secure the coupling pin 36 within the center opening 13 of the plate 10 under a positive three point contact.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

I claim:

1. A fifth wheel locking mechanism between a semitrailer and a tractor including a connecting plate having a semicircular opening formed centrally therein and an entranceway having open communication therewith for receiving therein a coupling pin carried by the trailer wherein the improvement comprises:

a. a coupling pin locking means comprising a split retaining collar, b. said collar having a fixed portion carried by the connecting plate and extending semicircularly about the opening formed therein, c. a movable corresponding semicircular portion pivotally carried by the connecting plate to one side of the entranceway and movable therethrough into contact with the connecting pin, d. moving means connected to said movable semicircular portion of said locking means for pivoting it into and out of its entrance-blocking position, e. means movably carried by the connecting plate and connected to said moving means and responsive to the movement of the coupling pin into and out of the center opening formed in the connecting plate for operating said moving means so as to pivot said movable semicircular portion of said locking means through the entranceway into and out of locking position about the locking pin, and f. a manually operated latching member carried by the connecting plate for securing said movable portion of said locking means in locked position about the coupling pin when the latter is moved into the center opening of the connecting plate.

2. A fifth wheel locking mechanism as defined by claim 1 wherein said moving means comprises a toggle link assembly connected between said movable semicircular portion of said locking means and said operating means for pivoting said movable semicircular portion of said locking means through the entranceway into and out of latching position about the coupling pin.

3. A fifth wheel locking mechanism as defined by claim 1 wherein said operating means comprises a spring-urged actuating plunger carried by the connecting plate and having one end normally positioned within the center opening and in radial alignment with the entranceway, with the plunger movable by the coupling pin out of the center opening so as to operate said moving means to pivot said movable semicircular portion of said locking means through the entranceway into and out of latching position about the coupling pin.

4. A fifth wheel locking mechanism as defined by claim 3 wherein said moving means comprises a toggle link assembly connected between said movable semicircular portion of said locking means and said spring-urged actuating plunger for pivoting said movable semicircular portion of said locking means through the entranceway into and out of latching position about the coupling pin.